Jan. 30, 1951     E. G. HUZENLAUB ET AL     2,539,999
PROCESS FOR ALTERING FLAVOR OF CEREALS
Filed Nov. 3, 1945
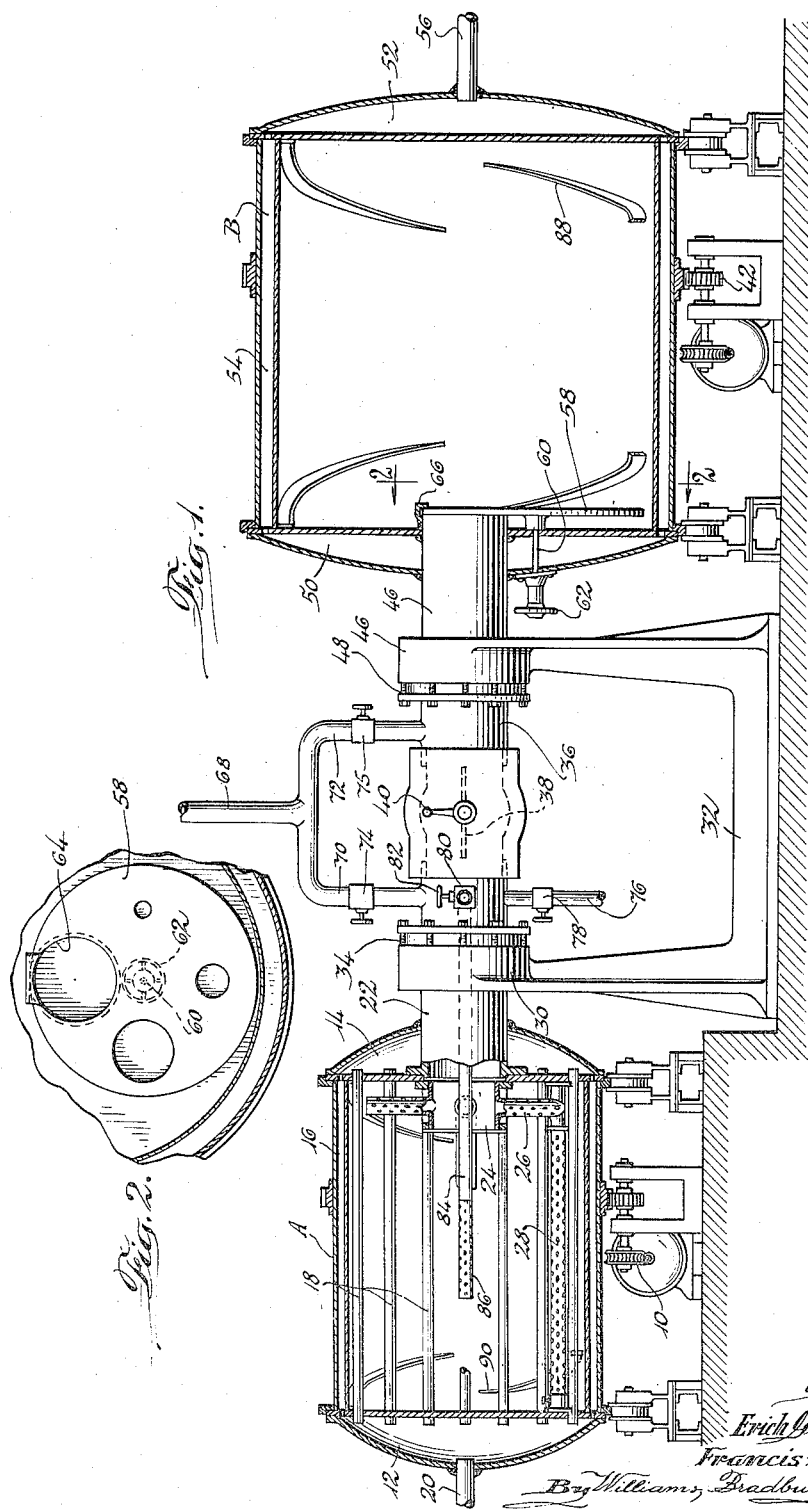
Inventors:
Erich Gustav Huzenlaub
Francis Heron Rogers
By Williams, Bradbury & Hinkle
Attorneys Patented Jan. 30, 1951

2,539,999

UNITED STATES PATENT OFFICE 2,539,999

PROCESS FOR ALTERING FLAVOR OF CEREALS

Erich Gustav Huzenlaub, Brentford, and Francis Heron Rogers, Elmhurst, Kenley, England, assignors, by direct and mesne assignments, to Mars and Huzenlaub, Chicago, Ill., a copartnership Application November 3, 1945, Serial No. 626,560
In Great Britain September 25, 1945

10 Claims. (Cl. 99—80)

This invention relates to a process and means for the treatment of cereals for food.

The object of the invention is the production from grain such as wheat, rice, barley or oats of a neutral tasting product that is free from characteristic scent or smell, and whereby having attained such point of neutral identification, any of the above-mentioned cereals after treatment for neutrality can have imparted to them the flavor and taste of a grain other than that which would have been its own.

A further object of the invention is to utilize a simplified form of apparatus for what is known as "conversion" whilst simultaneously enriching the endosperm or starch particles of the said grain with a high vitamin content obtained from the germ and other parts of the whole grain.

The term "conversion" herein used is the result of a physical change of state in the starch of the endosperm, whereby the starch particles are without voids having a continuous inter-adhesive structure, and are therefore translucent or nearly translucent, and the grain after drying is hard, lustrous and insect resistant with greatly increased keeping and cooking qualities.

The term "vitamin enrichment" means that the grain milled to remove bran and thus consisting mainly of the endosperm or the flour produced therefrom, contains a very large proportion of the total vitamin content of the whole unmilled grain.

According to the vitamin retention contemplated herein the endosperm of the grain would have imparted to it up to 85 per cent of the vitamin residual in the whole grain and therefore have a high nutritional value after milling, either as a partly milled grain when eaten as such, as in the case of rice or barley, or milled as flour, hominy or semolina, or the like for baking or other purposes.

It has now been observed firstly that if cereals of the character set out above are treated with water, water vapor and heat, an enlargement of the fat globules ensues and the glutenous and starchy contents of the aleurone layer and other layers enlarge by water penetration, and this has the effect of liberating under conditions hereinafter described any volatile esters or other volatile matters which constitute or contribute to the characteristic smell of any particular grain. Similarly, rancidity is produced during oxidation of the fat particles as for instance up to those of the production of butyric acid, which may be of the acetic or oleic series, and which are relatively miscible when hot with water, are entrained with the water vapor and removed from the grain and possibly later condensed. Secondly, since the aleurone and other layers which act as a protective coating to the grain taper off altogether or are extremely thin and tenuous around the germ of most grains, the process of water softening the whole grain and particularly the germ by repeated steaming and blowing, even in the first of such series of steam access and condensation creates solution of the vitamin content of the germ, and of the other vitamin carriers in the cereal, such that the endosperm which carries otherwise a type of waterproof coating under conditions hereinafter described is receptive of moisture and absorbs through its capillaries the aqueous vitamin solute, of which latter the vitamins become ingrained or locked in the starch and thereafter so remain when the water of the solute is partially or wholly removed by drying or the like.

In the case of wheat the vitamin rich scutellum coating of the embryo gives a highly vitaminized solution, assisted by osmotic transference within the grain particles, which solutation is easily assimilated by the starch within the grain.

The above observations lead to the process and apparatus necessary for effecting the objects set out above and the invention consists in a method of and means for treating cereal grain comprising subjecting said wet or dry and relatively cold grain in husk or otherwise to the influence of saturated steam in a closed steam jacketed vessel to promote condensation of moisture upon and absorbency of water within said grain at atmospheric pressure or lower pressures with continuation of said steam admission until pressure above atmosphere arises and the temperature within the grain reaches the temperature of such steam followed by the step of sudden evacuation or blow-off in such a manner that a condition of steam distillation is created whereby the grain scent carriers become entrained in the steam thus being blown off, or until the volatilization point of the grain scent carriers is reached with outside condensation of the vapors away from the said vessel and then resteaming the grain until a pressure above atmospheric pressure is attained, suddenly releasing said steam and repeating this steaming and steam release process until the required moisture retention of the grain is satisfied, and preferably without removing said grain, subjecting it to a flavoring process if it is desired to obtain a final product which is not neutral in taste and flavor but contains a taste and flavor different from that of the grain being treated and then drying whilst supplying heat until the desired dryness is obtained.

Under the invention above set forth various types of grain can be brought to a uniform neutral level of both taste and smell, permitting such neutralized product to be flavored and a permanent taste and smell imparted thereto which is or are of a differing character from their natural taste and smell characteristics. The endosperm of the grain so treated is heavily enriched with vitamins, whereby the final product is upgraded nutritionally and being converted in the process has greatly enhanced keeping and cooking qualities. Thus the surplus grain product of one land can be tretaed to a physical condition and to neutral or flavored taste and exported to supply the needs of another country in which, normally the inherent taste and flavor of the surplus grain product and its normal finished condition are not accepted by the consumer.

Thus each cereal grain has its individual aroma, flavor and taste. Wheat, oats, barley, rice and the like are recognizable as such by almost every person, before and after domestic preparation. These flavor distinctions are a serious disadvantage when, for instance, one cereal is supposed to be used for purposes for which it has been customary to use another cereal. As illustrations the following examples:

(a) If barley or oats flour were used instead of wheat for bread, the taste and flavor of the new bread would not be acceptable to the majority of the consumers.

(b) If rice consumers, especially those in the Near and Far East, were given wheat or oats or barley kernels or flour instead of rice, the new product—tasting fundamentally different—would not be acceptable by a large section of the rice consuming populace.

(c) If oats or wheat were used in the brewing of beer, instead of barley and rice or maize grits, the customer might not accept a beverage with an entirely altered aroma, flavor or taste.

The differences in aroma and taste between the various cereals are due to certain volatile constituents, soluble aromatic compounds and such as are latent in their inherent organic and fatty acids.

It has been ascertained that a specific type of sudden evacuation of the steam introduced to the treatment vessel, and repetition of such evacuation is capable of eliminating the inherent taste and smell of the grain treated, and further that the grain so treated and vitamin enriched and neutralized as to taste and smell can before drying have any desired flavor or aroma imparted to it. The said flavoring matters may consist of a concentrate of the vaporous matters available upon condensation from the blow-off, or of flavors synthetically or otherwise prepared and introduced to the grain, subsequent to the last blow-off but prior to drying.

Such influences upon cereal grains are produced in the following manner:

The dry or wet and relatively cold grain kernels are subjected in a closed vessel;

(a) to saturated steam until a true steam pressure of more than 14.7 lbs. absolute pressure per square inch is obtained in the vessel. This steam treatment in the first case may be preceded by air evacuation and is desirable in treating cereals in the husk such as paddy.

(b) Several minutes (from, say, 2 to 10 minutes) after the grain kernels in the closed vessel have attained the temperature corresponding to the pressure of the steam, a valve in a pipe connecting the interior of the closed vessel to atmosphere is quickly opened so that the steam under pressure in the vessel escapes suddenly and rapidly, i. e., is "blown off."

(c) The degree to which the deleterious flavors and aromas of a cereal grain are eliminated and to which the smell and taste characteristic to the grain, which is being processed, are removed is dependent inter alia upon the ratio of size of blow-off orifice or valve opening to the volume of the grain free content of the closed vessel. The term orifice above may apply to the size of the blow-off pipe. For convenience the size of the pipe is given below in the following examples of treated cereals.

(d) If, for example, it is desired that the deleterious flavors or aromas of the grain should be removed from it, but that the pleasing flavor and aroma and the taste characteristic to the cereal be retained, then a 9-inch blow-off pipe is to be used on a vessel having a volume of between 600 to 1000 cubic feet, if filled to 50 to 70 per cent with grain.

(e) If, on the other hand, the deleterious and part of the nondeleterious flavors and aromas are desired to be removed, then an 11-inch to 13-inch blow-off pipe and valve are to be used on such sized vessel.

(f) If, again, the deleterious flavors and aromas and a still greater degree of the nondeleterious flavors are desired to be removed, then a 14-inch to 16-inch blow-off pipe and valve is to be used.

(g) If, again, the aromas and flavors of the finished product are to be still less noticeable than when the method f is employed, then a 16-inch to 18-inch blow-off pipe and valve are to be used. The larger the pipe and valve, the closer to neutral the aroma and flavor of the finished product will be.

(h) If part of the deleterious and all nondeleterious flavors and aromas are to be retained in the finished product, then a 1-inch to 6-inch blow-off pipe and valve are to be used. The smaller the pipe, within above limits, the greater the retention of such aromas and flavors in the grain.

(i) If, again, not only all the aromas and flavors are to be removed, but also the taste, partly or wholly which is characteristic to the cereal, then a 20-inch to 24-inch pipe and valve are to be used. The larger the pipe and valve, the greater the degree of removal of characteristic taste. In order to remove the finer remnants of such taste, the process of b or d must be repeated two to five times.

In a the expression "more than 14.7 pounds absolute pressure per square inch" has been used. In the case of wheat and barley, the final pressure should be between 25 and 45 pounds or so, absolute. In the case of oats, the final pressure should be between 20 and 45 pounds, absolute.

In b the expressions "A valve . . . is quickly opened" and "so that the steam . . . escapes suddenly and rapidly," these expressions are to signify:

An ordinary screw steam valve will not give the means for the valve to be opened "quickly" in the intended sense; the valve should be of the so-called "quick-opening lever gate" type or mechanically, electrically or hydraulically operated gate valve or buterfly valve with very little time-lag between the start of the opening operation and the point at which the valve is fully open. "Suddenly" and "rapidly" are used in contradistinction to the speed of steam attained in the known "puffing" guns. As a "puffing" effect is undesirable for the purposes of these methods, the examples have placed restrictions upon the ratio of vessel volume/size of blow-off pipe. As examples we give:

(a) That in "puffing" guns the escape of steam out of a gun or pipe of, say, 8-inch diameter is finished in a fraction of a second. The ratio of valve size to vessel (gun) volume in such gun would be approximately 3 cubic feet to an 8-inch valve.

(b) That in Example d the time period of "blow-off" of steam, until the pressure in the vessel is reduced to atmosphere, when the final steaming steam pressure before blow-off was, say, 25 pounds absolute per square inch, is approximately 20 seconds.

(c) That in Example g the time period is approximately 3 seconds.

(d) That in Example i the time period is approximately 1½ seconds.

(e) That in Example h the time period with a 3-inch pipe and valve is approximately 5 minutes.

(The time periods given above vary in accordance with the larger or smaller quantities of grain present in the closed vessel and the higher or lower pressures employed and the time periods are principally given as an illustration of the distinction drawn by us between an "explosive" blow-off (as in puffing guns) and the kind of blow-off to be used for the purposes of this invention.)

Example 1

For wheat.—According to the invention 8 tons of wheat are placed into the steaming vessel having a capacity of 800 cubic feet and the grain temperature raised by saturated steam rapidly (i. e., in half a minute or so) to any pressure above 100° centigrade and below, say, 150° centigrade, preferably between 115 and 120° centigrade. Steam is introduced rapidly to the vessel in successive operations, i. e.:

(a) Steam treatment 2½ minutes at 10 pounds gauge pressure, then blow-off through 20-inch orifice.

(b) Steam treatment 2½ minutes at 10 pounds gauge pressure, then blow-off through 20-inch orifice.

(c) Steam treatment 2½ minutes at 10 pounds gauge pressure, then blow-off through 20-inch orifice.

(d) Steam treatment 2½ minutes at 10 pounds gauge pressure, then blow-off through 20-inch orifice.

(e) Vacuum up to 27 inches of mercury applied for 10 minutes. At the end of this treatment the product was neutral tasting.

(f) The free space in the vessel was approximately 560 cubic feet. The condensate of first blow-off was retained for redistillation.

(g) Flavor impregnation by spraying, if required. At the end of this treatment the wheat had 38 per cent of total moisture.

(h) Drying.

The interior of the treatment vessel prior to blowing off was 115 degrees centigrade.

The vitamin $B_1$ content of the milled product was 0.91 International units per gram.

Example 2

For barley.—Treatment as Example 1, in like vessel, charge 8 tons.

(a) Steam treatment 3½ minutes at 10 pounds gauge pressure, then blow-off through 20-inch orifice.

(b) Steam treatment 3 minutes at 10 pounds gauge pressure, then blow-off through 20-inch orifice.

(c) Steam treatment 4 minutes at 10 pounds gauge pressure, then blow-off through 20-inch orifice.

(d) Vacuum treatment up to 27 inches mercury for 10 minutes.

(e) At the end of this treatment, the flavor was reduced to neutral.

(f) The free space in the vessel was approximately 600 cubic feet.

(g) Then flavor impregnation by spraying, if required.

(h) Drying.

In the above examples the period of steam treatment may vary between 1 and 4 minutes for barley and likewise for oats and 2 to 6 minutes for wheat depending upon moisture content, age and nature of grain, ripeness, and country of origin.

In the accompanying drawing, Fig. 1 illustrates somewhat diagrammatically a prefered form of apparatus for carrying out our invention; and Fig. 2 is a partial sectional view taken on the line 2—2 of Fig. 1.

Referring to Fig. 1, it will be seen that we have therein illustrated a steaming and drying vessel A adapted to be rotated through suitable gearing 10 and having one or more covered openings (not shown) through which grain may be introduced and removed. The vessel A is of a generally cylindrical shape and is provided with steam jackets 12 and 14 adjacent its ends, these steam jackets being connected by an annular steam jacket 16 and by steam pipes 18. Steam is supplied to the jackets 12, 14 and 16 and pipes 18 through a conduit 20 connected with any suitable source of steam.

The vessel A is provided with a section of exhaust or blow-off pipe 22 which rotates with the vessel. The blow-off pipe 22 is connected through a head 24 and branches 26 with axially extending foraminous tubes 28 which preferably have the construction shown in our pending United States patent application Serial No. 613,238, filed August 29, 1945, but may have any other suitable construction. The section 22 of the blow-off pipe rotates in a bearing 30 carried by a pedestal 32 and a stuffing box 34 forms a sealed joint between the section 22 and a stationary section 36 of the blow-off pipe. This stationary section contains a butterfly valve 38 having an operating arm 40 connected with any suitable mechanism for quickly shifting the valve between closed and open positions.

In Fig. 1, we have shown the blow-off pipe as connecting the steam treating and drying vessel A with a second or flavoring vessel B which is mounted for rotation through gearing 42 and which is provided with a section 44 of blow-off pipe communicating with a stationary section 36 and rotating section 22 heretofore described. The section 44 has one end extending into a bearing 46 supported on the pedestal 32 and a stuffing box 48 forms a fluid-tight connection between this end and the adjacent end of the stationary portion 36 of the blow-off pipe.

The vessel B is provided with a closed opening or openings (not shown) through which grain may be introduced and removed. This vessel is also provided with steam jackets 50 and 52 at its ends and these jackets are connected by an annular steam jacket 54. A pipe 56 leads from any suitable source of steam supply and furnishes steam to the jackets 50, 52 and 54.

The end of the blow-off pipe which projects into the vessel B is provided with means to vary the effective size of this pipe so that any desired amount of flavors or aromas of the grain being treated in the steaming and drying vessel A can be removed. This means comprises a disk 58 mounted on a shaft 60 extending through one end of the vessel A and provided with a wheel 62 or other handle means whereby the disk 58 may be rotated to any desired position. As more clearly shown in Fig. 2, the disk 58 is provided with a plurality of openings 64, any one of which may be brought into alignment with the blow-off pipe. The openings 64 are of different sizes, the largest being equal in diameter to the inside diameter of the blow-off pipe. In the particular embodiment selected for illustration the disk 58 has only four openings 64 but this disk can be made of different sizes and provided with different numbers and sizes of openings as desired. A guide and support 66 is preferably welded or otherwise attached to the end of the blow-off pipe and has a depending portion overlying the disk 58 to help support the disk against the steam blast which is created when the butterfly valve 38 is suddenly shifted to open position.

The vessels A and B are preferably arranged for independent rotation and are of different sizes. In the illustration selected, the vessel B has twice the volumetric capacity of the vessel A. For use with certain types of grain, the different relative capacities of two vessels should be so selected that the volumetric capacity of the vessel B bears approximately the same ratio to the volumetric capacity of the vessel A as the volume of one pound of steam at atmospheric pressure bears to the volume of one pound of steam at the maximum steam pressure used in the vessel A.

Means are provided for independently connecting each of the vessels A and B with a source of vacuum. In Fig. 1, this means takes the form of a pipe 68 connected to a condenser or other source of vacuum and having brances 70 and 72 connected with the stationary portion 36 of the blow-off pipe on opposite sides of the butterfly valve 38. The branches are preferably provided with valves 74 and 75 of any usual construction. Steam may be supplied to the grain in the vessel A by way of a steam pipe 76 and that portion of the blow-off pipe which connects the steam pipe 76 with the interior of the vessel A. The steam pipe 76 is illustrated as being provided with the usual valve 78. Where it is desired to flavor a batch of grain in the vessel A, the flavoring material may be introduced through a pipe 80 and valve 82 connected to a pipe 84 extending axially of the vessel A and having a perforated section 86.

In utilizing the apparatus of Figs. 1 and 2, a batch of grain to be treated is introduced into vessel A and the cover reapplied to the opening through which the grain was introduced. For purposes of illustration we will assume that the batch of grain to be treated is composed of wheat. A second batch of a different kind of grain, such, for example, as rice, is introduced into flavoring vessel B and then this vessel is sealed by replacing the cover on the opening through which the grain was introduced. The quantities of grain in the two batches would ordinarily be equal. If desired, however, the quantity of rice may be more or less than the quantity of wheat and under these conditions the amount of flavor absorbed by the rice will be inversely proportional to the quantity thereof. That is, a larger batch of rice will receive a weaker flavor whereas a small batch of rice will receive a stronger flavor, other conditions being equal.

The wheat to be steamed and dried is preferably first subjected to a vacuum to remove as much air as possible from the grain itself and thereby facilitate the penetration of moisture into the grain. With the butterfly valve 38 in closed position, valve 74 is opened to connect the interior of vessel A with the condenser or other source of vacuum. The grain introduced into vessel A is preferably at atmospheric temperature so that when steam is introduced into the vessel A, the steam will condense on the grain and produce moisture which penetrates the individual grains. It is therefore not desirable to heat up the grain prior to the first steaming operation, but it is desirable to introduce a small amount of steam into the steam jackets 12, 14, and 16 and pipes 18 to heat these parts to such a temperature that little condensation will occur thereon and most of the condensate will be formed directly on the grain. During the withdrawal of air from the vessel A, this vessel is preferably rotated through gearing 10 to produce an agitation of the grain and so expose all parts thereof to the subatmospheric pressure.

As soon as a sufficiently high vacuum has been produced in the vessel A, the vacuum valve 74 is closed and saturated steam introduced by opening steam valve 78. The inrushing steam strikes the cold grain and condenses thereon and the condensate thus formed tends to penetrate the grain. In accordance with Example 1 heretofore described, the steam pressure is permitted to build up to approximately 10 pounds gauge and is maintained for 2½ minutes. During this period the grain is agitated by the rotary motion of the vessel A, the individual grains are heated, and the moisture from the steam penetrates an appreciable distance into the endosperm.

While the wheat in vessel A is being steamed, vessel B is evacuated through valve 75 to produce therein a vacuum in the order of 27 inches of mercury. During this period vessel B is preferably rotated through gearing 42 to agitate the grain therein. In order to increase the agitation of the grain, the vessel B is provided with helical inwardly projecting baffles 88 and the vessel A is preferably provided with similar baffles 90. The rice in vessel B is at approximately atmospheric temperature and it is undesirable to heat this rice prior to introduction to the blow-off vessel A. However, during this preparatory period, a small amount of steam may be introduced into the steam jackets of vessel B to warm up the walls of this vessel and reduce condensation thereon when the blow-off is introduced.

After vessel B has been evacuated, the valve 75 is closed. If the disk 58 is not in the desired position, rotation of vessel B is momentarily stopped and the disk 58 is moved to bring the proper opening into registration with the blow-off pipe.

After the wheat in vessel A has been steamed for 2½ minutes, the butterfly valve 38 is suddenly opened to connect the interior of vessel A which is then at 10 pounds gauge pressure with the interior of vessel B which is preferably under a vacuum of about 27 inches of mercury. The blow-off pipe which connects the two vessels is made of such size as to give the maximum rate of blow-off desirable under any conditions and the actual rate of blow-off for any particular treatment is determined by the position of the disk 58. If it is desired to transfer maximum taste and aroma from the wheat to the rice, the maximum size opening 64 is brought into alignment with the blow-off pipe, but if a lesser transfer of aroma and flavor is desired, a smaller opening 64 is placed in alignment with the blow-off pipe.

The sudden opening of the blow-off valve 38 produces a rush of steam from the vessel A to the vessel B and the resulting rush of steam around the grains of wheat in vessel A distills off those ingredients of the wheat which produce flavor and aroma therein, the degree of distillation being determined by the position of the disk 58. The vapors discharged from vessel A rush into vessel B and condense on the relatively cold rice therein and impart a wheat flavor to this rice. The extent to which this wheat flavor is imparted to the rice depends upon the degree of distillation of the wheat and also upon the quantity of rice in the vessel B. During this blow-off, both vessels are preferably rotated and in fact such rotation is preferably continued throughout the treatment. When the pressure in the two vessels has equalized, the blow-off valve 38 is closed.

Steam valve 78 is then again opened to introduce steam into vessel A and a steam pressure of approximately 10 pounds gauge pressure is maintained for 2½ minutes. During this second steaming the moisture penetrates further into the endosperm of the wheat. In the meantime, vessel B is again evacuated in preparation for the next blow-off. At the termination of 2½ minutes steaming period, blow-off valve 38 is again suddenly opened and left open until the pressure in the two vessels is equalized. This blow-off valve is then closed and the cycle of operation is repeated until the wheat in vessel A has been subjected to the desired number of steaming operations. At the conclusion of the steaming operations, the endosperms of the wheat grains have been completely penetrated by the moisture.

At the end of the last steaming operation and completion of the blow-off following such operation, the interior of vessel A is preferably connected to the condenser and subjected to a vacuum of approximately 27 inches of mercury for about 10 minutes. During this period agitation of the grain is maintained and the steam jackets are maintained only slightly warm. If it is desired to flavor the wheat while still in the treating vessel A, the flavoring material can be introduced by opening valve 82 while vessel A is rotating and is cut off from the source of vacuum.

After the grain has been sprayed with the flavoring material and has been left exposed to this material for a desired length of time, the grain in vessel A is dried by connecting this vessel to the source of vacuum and by supplying the maximum amount of steam to the steam jackets 12, 14 and 16 and steam pipes 18. When the grain attains normal moisture content, it is removed from vessel A and stored in a tempering bin or otherwise handled in any suitable manner.

Having now particularly described and ascertained the nature of our said invention, and in what manner the same is to be performed, we declare that what we claim is:

1. That method of substantially completely eliminating the volatiles making up the natural flavor of a cereal grain, while enriching the endosperm with vitamins naturally present in other parts of the grain and also rendering the starch of the endosperm substantially translucent, which comprises, agitating a batch of grain to be treated while repeatedly subjecting said batch to wet steam under pressure, and suddenly releasing the steam pressure at the end of each steaming operation, said sudden release of steam pressure being of the order of a discharge of one to three seconds duration from a vessel having a volume of 600 to 1000 cubic feet, 50 percent to 70 percent filled with grain.

2. The method as defined in claim 1, wherein the grain to be treated is subjected to a vacuum prior to the first of the steaming operations.

3. The method of altering the flavor of a grain which comprises, repeatedly subjecting a batch of one kind of grain to treatment with wet steam under pressure, condensing the wet steam on the grains, dissolving in the steam so condensed vitamins naturally present in parts of said grains other than the endosperm, enriching the endosperm with vitamins so dissolved, rendering the starch of the endosperm substantially translucent, suddenly releasing the steam after each foregoing pressure treatment therewith and causing the blown-off steam to remove volatiles making up the characteristic flavor of said grains, thereafter impregnating the grains of said batch with steam-distillable sapid volatiles that are unlike said first-named volatiles and from a different kind of grain, and drying said batch.

4. The method of altering the flavor of a grain which comprises, repeatedly subjecting a batch of one kind of grain to treatment with wet steam under pressure, condensing the wet steam on the grains, dissolving in the steam so condensed vitamins naturally present in parts of said grains other than the endosperm, enriching the endosperm with vitamins so dissolved, rendering the starch of the endosperm substantially translucent, suddenly releasing the steam after each foregoing pressure treatment therewith and causing the blown-off steam to remove volatiles making up the characteristic flavor of said grains, thereafter imparting a flavor of a different kind of cereal thereto, and drying said batch.

5. The method of substituting in wheat grains the flavor characteristic of rice for the flavor characteristic of the wheat which comprises, repeatedly subjecting a batch of wheat grains to treatment with wet steam under pressure, condensing the wet steam on the grains, dissolving in the steam so condensed vitamins naturally present in parts of said grains other than the endosperm, enriching the endosperm with vitamins so dissolved, rendering the starch of the endosperm substantially translucent, suddenly releasing the steam after each foregoing pressure treatment therewith, and causing the blown-off steam to remove volatiles making up the characteristic flavor of said wheat grains, thereafter impregnating the grains of said batch with the steam-distillable, sapid volatiles of rice, and drying said batch.

6. The method of substituting in oat grains the flavor characteristic of rice for the flavor characteristic of the oats which comprises, repeatedly subjecting a batch of oat grains to wet steam under pressure, condensing the wet steam on the grains, dissolving in the steam so condensed vitamins naturally present in parts of said grains other than the endosperm, enriching the endosperm with vitamins so dissolved, rendering the starch of the endosperm substantially translucent, suddenly releasing the steam after each foregoing pressure treatment therewith, and causing the blown-off steam to remove volatiles making up the characteristic flavor of said oat grains, thereafter impregnating the grains of said batch with the steam-distillable, sapid volatiles of rice, and drying said batch.

7. The method of substituting in barley grains the flavor characteristic of rice for the flavor characteristic of the barley which comprises, repeatedly subjecting a batch of barley grains to wet steam under pressure, condensing the wet steam on the grains, dissolving in the steam so condensed vitamins naturally present in parts of said grains other than the endosperm, enriching the endosperm with vitamins so dissolved, rendering the starch of the endosperm substantially translucent, suddenly releasing the steam after each foregoing pressure treatment therewith, and causing the blown-off steam to remove volatiles making up the characteristic flavor of said barley grains, thereafter impregnating the grains of said batch with the steam-distillable, sapid volatiles of rice, and drying said batch.

8. The method of substituting in oat grains the flavor characteristic of wheat for the flavor characteristic of the oats which comprises, repeatedly subjecting a batch of oat grains to wet steam under pressure, condensing the wet steam on the grains, dissolving in the steam so condensed vitamins naturally present in parts of said grains other than the endosperm, enriching the endosperm with vitamins so dissolved, rendering the starch of the endosperm substantially translucent, suddenly releasing the steam after each foregoing pressure treatment therewith, and causing the blown-off steam to remove volatiles making up the characteristic flavor of said oat grains, thereafter impregnating the grains of said batch with the steam-distillable, sapid volatiles of wheat, and drying said batch.

9. The method as defined in claim 3, wherein the grain to be treated is subjected to a vacuum prior to the impregnation of the grain with sapid volatiles.

10. The method as defined in claim 4, wherein the grain to be treated is subjected to a vacuum prior to the impregnation of the grain with flavor-imparting material.

ERICH GUSTAV HUZENLAUB.
FRANCIS HERON ROGERS.

REFERENCES CITED

The following references are of record in the file of this patent:

UNITED STATES PATENTS

| Number | Name | Date |
| --- | --- | --- |
| 114,891 | Waitt | May 16, 1871 |
| 433,399 | Elsworth et al. | July 29, 1890 |
| 640,161 | Hesse | Dec. 26, 1899 |
| 701,750 | Maxim | June 3, 1902 |
| 901,455 | Lauhoff | Oct. 20, 1908 |
| 1,086,950 | Stanton | Feb. 10, 1914 |
| 1,185,622 | Boss | June 6, 1916 |
| 1,395,014 | Rowell | Oct. 25, 1921 |
| 1,461,703 | Chidlow | July 10, 1923 |
| 1,717,489 | Barlow | June 18, 1929 |
| 1,799,256 | Satow | Apr. 7, 1931 |
| 1,867,541 | Shellabarger | July 12, 1932 |
| 2,195,165 | Choppin | Mar. 26, 1940 |
| 2,239,608 | Huzenlaub et al. | Apr. 22, 1941 |
| 2,264,574 | Kellogg | Dec. 2, 1941 |
| 2,287,737 | Huzenlaub | June 23, 1942 |
| 2,358,250 | Rogers | Sept. 12, 1944 |
| 2,358,251 | Huzenlaub | Sept. 12, 1944 |
| 2,412,153 | Huzenlaub | Dec. 3, 1946 |

FOREIGN PATENTS

| Number | Country | Date |
| --- | --- | --- |
| 111,968 | Australia | 1940 |
| 118,904 | Australia | Sept. 14, 1944 |
| 518,493 | Great Britain | Feb. 28, 1940 |
| 544,360 | Great Britain | 1942 |
| 552,510 | Great Britain | 1943 |